(12) United States Patent
Wang et al.

(10) Patent No.: US 7,414,090 B2
(45) Date of Patent: *Aug. 19, 2008

(54) LOW-TEMPERATURE PRESS PROCESS FOR MAKING INSULATING GLASS ASSEMBLIES

(75) Inventors: Bing Wang, Woodbury, MN (US); John E. Greenzweig, Minneapolis, MN (US); Mark E. Hackbarth, Stillwater, MN (US)

(73) Assignee: H.B. Fuller Licensing & Financing, Inc, St. Paul, MN (US)

( * ) Notice: Subject to any disclaimer, the term of this patent is extended or adjusted under 35 U.S.C. 154(b) by 0 days.

This patent is subject to a terminal disclaimer.

(21) Appl. No.: 11/684,041

(22) Filed: Mar. 9, 2007

(65) Prior Publication Data

US 2007/0154663 A1    Jul. 5, 2007

Related U.S. Application Data

(62) Division of application No. 10/798,590, filed on Mar. 11, 2004, now Pat. No. 7,204,902.

(60) Provisional application No. 60/453,552, filed on Mar. 11, 2003.

(51) Int. Cl.
*C08L 23/26* (2006.01)
*C08L 23/22* (2006.01)

(52) U.S. Cl. .................. 524/515; 524/271; 524/274; 524/474; 524/476; 524/499

(58) Field of Classification Search .............. 524/271, 524/274, 474, 476, 515, 499
See application file for complete search history.

(56) References Cited

U.S. PATENT DOCUMENTS

| | | | |
|---|---|---|---|
| 3,424,836 A | 1/1969 | McKelvey et al. |
| 3,919,023 A | 11/1975 | Bowser et al. |
| 4,109,432 A | 8/1978 | Pilz |
| 4,546,723 A | 10/1985 | Leopold et al. |
| 4,617,073 A | 10/1986 | Scott |
| 4,831,799 A | 5/1989 | Glover et al. |
| 4,950,344 A | 8/1990 | Glover et al. |
| 5,061,531 A | 10/1991 | Catalano |
| 5,234,730 A | 8/1993 | Lautenschlaeger et al. |
| 5,264,515 A | 11/1993 | Cody et al. |
| 5,397,648 A | 3/1995 | Babu et al. |
| 5,436,040 A | 7/1995 | Lalond |
| 5,510,416 A | 4/1996 | Meyer et al. |
| 5,632,122 A | 5/1997 | Spinks |
| 5,849,832 A | 12/1998 | Vimelson et al. |
| 5,855,972 A | 1/1999 | Kaeding |
| 5,994,474 A | 11/1999 | Wey et al. |
| 6,055,783 A | 5/2000 | Guhl et al. |
| 6,121,354 A | 9/2000 | Chronister |
| 6,235,848 B1 | 5/2001 | Bickert et al. |
| 6,245,145 B1 | 6/2001 | Lisec |
| 6,281,288 B1 | 8/2001 | Bickert et al. |
| 6,286,288 B1 | 9/2001 | France |
| 6,319,990 B1 | 11/2001 | Spence et al. |
| 6,355,317 B1 | 3/2002 | Reid et al. |
| 6,368,408 B1 | 4/2002 | Schuler |
| 6,401,428 B1 | 6/2002 | Glover et al. |
| 6,455,637 B1 | 9/2002 | Jackson et al. |
| 6,463,706 B1 | 10/2002 | Guhl et al. |
| 6,679,013 B2 | 1/2004 | Hornung |
| 6,682,818 B2 | 1/2004 | Czaplicki et al. |
| 6,706,813 B2 | 3/2004 | Chiba et al. |
| 6,846,893 B1 | 1/2005 | Sherman et al. |
| 6,866,928 B2 | 3/2005 | Narum et al. |
| 2002/0069823 A1 | 6/2002 | Briese et al. |
| 2002/0072561 A1 | 6/2002 | Johoji et al. |
| 2002/0194813 A1 | 12/2002 | Vimelson et al. |
| 2004/0059069 A1 | 3/2004 | Grimm et al. |
| 2004/0074588 A1 | 4/2004 | Hornung et al. |
| 2004/0180154 A1 * | 9/2004 | Wang et al. ............ 428/34 |

FOREIGN PATENT DOCUMENTS

| | | |
|---|---|---|
| CA | 2258585 | 6/1998 |
| DE | 951040 | 9/1956 |
| DE | 196 24 236 A1 | 1/1998 |
| DE | 198 21 355 A1 | 11/1999 |
| EP | 0 852 280 B1 | 7/1998 |
| EP | 1 052 362 A2 | 11/2000 |
| FR | 2301678 | 9/1976 |
| FR | 2612244 | 9/1988 |
| GB | 1 496 540 | 12/1977 |
| JP | 1-163255 | 6/1989 |
| JP | 4-159371 | 6/1992 |
| JP | 5-179217 | 7/1993 |
| WO | WO 89/11513 A1 | 11/1989 |
| WO | WO 91/06580 | 5/1991 |
| WO | WO 98-25001 A2 | 6/1998 |
| WO | WO 00/47687 A1 | 8/2000 |

\* cited by examiner

*Primary Examiner*—Peter Szekely

(57) ABSTRACT

A process for making an insulating glass assembly is disclosed, the process including applying a sealant composition to a surface of a spacer; contacting the sealant composition with a glass pane, and applying pressure on the glass pane to bond the glass pane to the spacer through the sealant composition, the pressure being applied at an ambient temperature of from about 15° C. to about 60° C.

17 Claims, No Drawings

LOW-TEMPERATURE PRESS PROCESS FOR MAKING INSULATING GLASS ASSEMBLIES

CROSS-REFERENCE TO RELATED APPLICATIONS

This application is a divisional of U.S. patent application Ser. No. 10/798,590, now U.S. Pat. No. 7,204,902, filed Mar. 11, 2004, and incorporated herein, which claims the benefit of U.S. Provisional Application Ser. No. 60/453,552, filed Mar. 11, 2003, and incorporated herein.

BACKGROUND

The present invention relates to making insulating glass assemblies using a low-temperature press process.

Insulating glass assemblies such as insulating glass (IG) units and insulating sash assemblies often include a pair of glass panes maintained in a fixed spaced relation to each other by a spacing structure (spacer) and sealing structure that extends around the periphery of the inner facing surfaces of the glass sheets to define a sealed and insulating space between the glass panes. In the case of insulating sash assemblies, the spacer is an integral part of the sash frame and the glass panes are attached to the spacer by a sealant or adhesive composition. The sealant or adhesive composition is also used to seal the edges of the insulating glass assembly so as to establish a barrier that prevents moisture from penetrating into the interior of the assembly and potentially to prevent thermally insulating gases, like argon, from leaving the airspace.

Many construction materials are used in manufacturing insulating glass assemblies, including wood, metals (e.g., aluminum and steel), polymers such as polyvinyl chloride and composites (e.g., wood fiber reinforced polymer composites and fiberglass reinforced polymer composites). Insulating glass assemblies that include a thermoplastic spacer (e.g., polyvinyl chloride) can experience distortion and deformation when exposed to elevated temperatures leading to residual stresses in the bond line, which can then lead to a loss of bond integrity, bond durability, an increase in the potential for stress cracking and moisture intrusion into the sealed chamber of the assembly. Build up in residual stresses in the bond line is exacerbated by the mismatch in the coefficients of thermal expansion due to the dissimilar substrates (e.g., glass panes and a thermoplastic spacer).

Conventional insulating glass windows are currently manufactured in a two step process in which a stand-alone subassembly consisting of two pieces of glass and a spacer, which is referred to as an "insulating glass unit," is inserted into a sash frame to produce an insulating sash subassembly. The insulating sash is installed into a frame to make a window. Insulating glass units are typically manufactured according to processes known as "linear extrusion," SWIGGLE sealing, and hand gunning.

Hand gunning involves applying a sealant to a channel formed by the two panes of glass and the spacer. The sealant is either a two-component sealant, which is applied at room temperature or a single-component sealant, which is applied at relatively high temperatures (e.g., temperatures of at least 200° F.). Two-component sealants require metering, mixing and monitoring of the ratio of the two components. Two-component sealants also require time to cure to a sufficient degree to be suitable for handling and the equipment used to dispense the sealant is purged periodically to prevent blockage. Hot applied single-component sealants require a high application temperature, which can create safety issues. Hand gunning is often used to apply sealants to aluminum spacers, which have poor thermal performance. The nature of hand gunning results in a relatively low throughput and consequent higher cost per unit. Automated or semi-automated application equipment is costly.

Residential insulating glass units are often manufactured using a lineal extrusion process, which is referred to by the trade designation INTERCEPT. A linear extrusion process is described, e.g., in U.S. Pat. No. 5,177,916 (Misera) and U.S. Pat. No. 6,223,414B1 (Hodek). Linear extrusion involves coating the bottom inside of a channel of a spacer, which is typically made from metal. A desiccant matrix is often positioned on the inside bottom of the channel. The desiccant matrix is used to dry the insulating glass unit airspace and potentially remove chemical volatiles that may cause chemical fog from the airspace of the unit. At least one sealant is applied to the outer three sides of the spacer and a pair of glass panes are placed on the sealant on opposite sides of the spacer. The insulating glass unit is then passed through an oven heated to an air temperature in excess of 200° F. and a press, which is positioned in the oven, to adhesively bond the glass to the spacer. The pressure exerted on the insulating glass unit is at least 5 psi. High temperature and pressure is necessary to generate a sufficient bond between the glass and the spacer. Rollers are employed to apply pressure and move the unit through the oven.

Another insulating glass unit manufacturing technology is referred to by the trade designation SWIGGLE and involves the use of a rope-like product that includes a sealant, desiccant, and a spacer. The rope is positioned between two panes of glass and passed through a roller oven/press to bond the panes of glass together at oven air temperatures in excess of 160° F. Roller oven/press processes require relatively large amounts of energy and additional equipment for complex manufacturing and handling hot insulating glass assemblies.

Once the insulating glass unit is prepared, the unit is then secured in a frame, which is referred to as "glazing." Glazing is typically accomplished by one of two processes. In one process, an adhesive strip or glazing tape is attached to a structure on the profile (i.e., "glazing leg") of a frame and the insulating glass unit is adhered to the exposed surface of the glazing tape. Glazing stops or beads are then placed over the insulating glass unit in order to provide static pressure against the unit, reduce the UV light exposure and improve visual look of the sash.

In another process, which is referred to as "back-bedding sealing," a sash frame is placed horizontally on an X-Y back-bedding machine that is capable of laying down a continuous bead of sealant along the glazing leg. The insulating glass unit is then adhered to the bead of sealant and glazing stops are attached to the sash. The back bedding sealant forms a seal between the insulating glass unit and the sash frame.

A relatively new window construction has been developed and utilizes an integrated sash design whereby the insulating glass assembly is an integrated part of the sash, i.e., the frame and insulating glass unit are not separate components. A variety of integrated insulating glass assemblies are available and are described in, e.g., U.S. Pat. No. 5,653,073 (Palmer), U.S. Pat. No. 6,055,783 (Guhl et al.), U.S. Pat. No. 6,286,288 (France), and U.S. Pat. No. 6,401,428 (Glover et al.).

These numerous commercially available approaches provide some flexibility in both the final window design and in the materials selected to make the windows. However, most approaches utilize sealant compositions that require application at elevated temperatures and pressures to achieve the desired properties, which consume relatively high amounts of energy. Heat may also distort the spacer and frame. There remains a need for systems that utilize sealant compositions capable of bonding a glass pane to a spacer without high temperature and pressure.

SUMMARY

In one aspect, the invention features a process for making an insulating glass assembly, the process including applying a sealant composition to a surface of a spacer, contacting the sealant composition with a glass pane, and applying pressure on the assembly to bond the glass pane to the spacer through the sealant composition, the pressure applied being from about 2 psi to about 50 psi at a temperature of from about 15° C. to about 60° C. In one embodiment, the process further includes applying a sealant composition to a second surface of the spacer, contacting the sealant composition on the second surface of the spacer with a second pane of glass, and applying pressure on the assembly to bond the second glass pane to the spacer through the sealant composition, the pressure applied being from about 2 psi to about 50 psi at a temperature of from about 15° C. to about 60° C.

In another embodiment, the process further includes applying sealant composition to at least two opposite surfaces of the spacer simultaneously. In other embodiments, the process further includes applying pressure to the first pane of glass and the second pane of glass simultaneously. In some embodiments, applying the sealant composition includes dispensing the sealant composition at a temperature greater than 90° C. In other embodiments, applying the sealant composition includes dispensing the sealant composition at a temperature from about 50° C. to about 150° C.

In one embodiment, the sealant exhibits a needle penetration of from about 3.5 mm to less than 8.0 mm.

In some embodiments, the pressure is applied by a press selected from the group consisting of a platen press, a roller press or a combination thereof.

In other embodiments, the pressure is applied while the assembly is in a vertical position.

In other embodiments, the sealant includes silane-functional amorphous poly-α-olefin, butyl rubber, polyisobutylene, and tackifying agent. In some embodiments, the sealant further includes amorphous poly-α-olefin.

In one embodiment the spacer is metallic. In other embodiments, the spacer includes polymer. In some embodiments, the spacer extends from a sash frame and is integral with the sash frame.

In other aspects, the invention features a process for preparing an insulating glass unit.

In some embodiments, the process further includes applying a second sealant composition to a frame, contacting the second sealant composition with the insulating glass assembly prepared in claim 1, and applying a pressure to the frame and assembly to bond the frame to the assembly through the second sealant composition. In one embodiment, the second sealant composition includes silane-functional amorphous poly-α-olefin, butyl rubber, polyisobutylene, and tackifying agent, the composition exhibiting a needle penetration from about 3.5 mm to less than 8.0 mm. In some embodiments, the insulating glass assembly passes the ASTM E774/773 Class C performance requirement, the ASTM E774/773 Class CB performance requirement, or even the ASTM E774/773 Class CBA performance requirement.

In one embodiment, the process for making an insulating glass assembly includes applying a sealant composition on a first surface of a spacer and a second surface of the spacer, contacting the sealant composition on the first surface of the spacer with a first pane of glass, contacting the sealant composition on the second surface of the spacer with a second pane of glass, applying pressure on the assembly at an ambient temperature of from about 15° C. to about 60° C. to bond the first glass pane to the spacer through the sealant; and applying pressure on the assembly at an ambient temperature of from about 15° C. to about 60° C. to bond the second glass pane to the spacer through the sealant. In one embodiment, the insulating glass assembly passing ASTM E774/773 Class C performance requirement. In other embodiments, the insulating glass assembly passes at least one of ASTM E774/773 Class CB performance requirement and ASTM E774/773 Class CBA performance requirement. In some embodiments, the insulating glass assembly, when tested according to ASTM E1887-97, is free of visible fog.

In some embodiments, the pressure applied to the first bond line between the first pane of glass and the spacer is from about 2 psi to about 100 psi and the pressure applied to the second bond line between the second pane of glass and the spacer is from about 2 psi to about 100 psi. In other embodiments, the pressure is applied simultaneously to the first bond line and the second bond line. In another embodiment, the composition of the sealant composition on the first surface of the spacer differs from the composition of the sealant composition on the second surface.

In another aspect, the invention features a moisture curable sealant composition that includes silane-functional amorphous poly-α-olefin, butyl rubber, polyisobutylene; and tackifying agent, the composition exhibiting a needle penetration from about 3.5 mm to less than 8.0 mm. In one embodiment, the composition further includes amorphous poly-α-olefin. In some embodiments, the sealant composition exhibits a moisture vapor transmission rate no greater than 1 g/m$^2$/day.

In other aspects, the invention features an insulating glass assembly that includes an insulating glass unit that includes a) a first glass pane, b) a second glass pane, c) a spacer, and d) a sealant composition, the first glass pane being bonded to a first surface of the spacer through the sealant composition, the second glass pane being bonded to a second surface of the spacer through the sealant composition, a frame, and a second sealant composition, the insulating glass unit being bonded to the frame through the second sealant composition, the second sealant composition including silane-functional amorphous poly-α-olefin, butyl rubber, polyisobutylene, and tackifying agent. In one embodiment, the second sealant composition exhibits a needle penetration from about 3.5 mm to less than 8.0 mm. In some embodiments, the first sealant composition includes silane-functional amorphous poly-α-olefin, butyl rubber, polyisobutylene, and tackifying agent.

In another aspect, the invention features an insulating glass assembly that includes a first glass pane, a second glass pane, a spacer, and a sealant composition disposed between the first pane of glass and the spacer and the second pane of glass and the spacer, the sealant composition including silane-functional amorphous poly-α-olefin, butyl rubber, polyisobutylene, and tackifying agent.

The invention features an ambient press process for bonding a pane of glass to a substrate (e.g., bonding a glass pane to a spacer in an insulating glass assembly) at an ambient temperature of from about 15° C. to about 60° C. using pressure, preferably from about 5 psi to about 100 psi, or even from about 5 psi to about 50 psi. The invention also features a moisture curable sealant composition that exhibits low levels of moisture vapor transmission. In some formulations the moisture curable sealant composition is capable of bonding glass to a substrate at low temperature with pressures from about 5 psi to about 100 psi, or even from about 5 psi to about 50 psi.

Other features and advantages will be apparent from the following description of the preferred embodiments and from the claims.

DETAILED DESCRIPTION

The process is well suited to making a variety of insulating glass assemblies including, e.g., insulating glass units and sash frame assemblies. Insulating glass assemblies include a spacer having at least two glazing surfaces (i.e., surfaces used to bond a pane of glass), a sealant composition, and at least two panes of glass bonded to the spacer through the sealant composition to enclose a sealed chamber. The insulating glass assembly can include a desiccant positioned in the sealed chamber. The spacer can include a channel, e.g., a U-shaped channel, in which the desiccant is disposed. The spacer can be constructed such that it extends from the frame and is integral with the frame. In other embodiments, the spacer can be a separate structure that is used to form an insulating glass unit, which is then further processed by bonding the insulating glass unit to a sash frame. Examples of integrated multipane window units, insulating glass units, and sash assemblies are described in U.S. Pat. No. 6,286,288 (France), U.S. Pat. No. 6,055,783 (Guhl et al.), U.S. Pat. No. 6,401,428 (Glover et al.), U.S. Pat. No. 5,653,073 (Palmer) and U.S. Pat. No. 5,177,916 (Misera et al.) and PCT Publication No. WO 99/14169 (Guhl et al.) and WO 98/25001 (France), and incorporated herein.

The process includes applying a sealant composition to a surface of a spacer, contacting the sealant composition with a glass pane and applying pressure on the glass pane to bond the glass pane to the spacer through the sealant composition, the pressure applied being from about 2 psi to about 100 psi, or even from about 2 psi to about 50 psi, at an ambient temperature of from about 15° C. to about 60° C. The resulting assembly preferably exhibits an initial lap shear of at least 2 psi, or even at least 10 psi, and preferably a final lap shear of at least 10 psi, or even at least 15 psi after 12 weeks.

The sealant composition can be applied to a glazing surface, e.g., a surface on the spacer, the perimeter of the glass pane that is positioned over the spacer, or both. The sealant composition can be applied to the glazing surface using any suitable applicator including, e.g., a hand held glue gun, extruder, linear extruder, other forms of extruder beads, automated application equipment, and combinations thereof. Sealant composition can also be applied simultaneously to different portions of the spacer or the glass pane using at least two applicators.

Applying the sealant preferably includes dispensing the sealant in the form of a melt at temperatures from about 50° C. to about 150° C., from about 60° C. to about 150° C., or even from about 75° C. to about 115° C.

The glass pane is then positioned against the sealant and the spacer. The location of the sealant between the glass pane and the spacer is referred to herein as the sealant "bond line."

Pressure is then applied to the assembly to bond the glass pane to the spacer. Preferably the pressure exerted on the sealant is from about 2 psi to about 50 psi at an ambient temperature from about 15° C. to about 60° C., for a period of time sufficient to bond the glass pane to the spacer. The dwell time, i.e., the time during which the pressure is applied to the bond line, is from 1 second to 60 seconds, or even from 2 seconds to 30 seconds.

Pressure can be applied to the assembly using a variety of press constructions including, e.g., a platen press, rollers, and combinations thereof. The press is dimensioned to provide a contact area sufficient to apply a sufficiently uniform force across the bond line.

The press can be positioned and constructed to receive an insulating glass assembly disposed horizontally or vertically. Pressure can be applied to the sealant bond line on one side of the assembly, or simultaneously on opposite sides of the assembly.

Insulating glass assemblies that come out of the pressing operation with sufficient handling strength can be further processed immediately and/or sent to distribution.

The insulating glass assembly can include vent holes, which allow communication between the sealed air space and with the ambient atmosphere. After the pressing process, the vent holes are sealed. Useful sealants include polyisobutylene and other compositions having moisture vapor transmission rate less than 1 g/m$^2$/day. In some embodiments, the insulating space is filled with a thermally insulating gas (e.g., air, Argon, Krypton and combinations thereof) through the vent hole in the assembly prior to sealing the vent hole. An example of such a process is described in, e.g., U.S. Pat. No. 6,055,783 (Guhl et al.).

The process can be used to make sealed insulating glass assemblies, the seal of which is maintained in the application environment. The insulating glass assemblies prepared according to the process, when tested according to ASTM E774-88 entitled, "Standard Specification for Sealed Insulating Glass Units," in conjunction with ASTM E773-97 entitled, "Standard Test Method for Accelerated Weathering of Sealed Insulating Glass Units," hereinafter referred to as "ASTM E774/773," preferably pass the Class C performance requirements, the Class CB performance requirements, or even the Class CBA performance requirements. The sealant can be used in the construction of insulating glass assemblies that, when tested according to ASTM E1887-97 entitled, "Standard Test Method for Fog Determination," are free of visible fog.

The sealant composition preferably exhibits a needle penetration of from at least 3.5 mm to less than 8.0 mm, or even from 4.0 mm to 6.0 mm when tested with a 100 g load. The sealant composition exhibits a moisture vapor transmission rate less than about 10 g/m$^2$/day, less than 1 g/m$^2$/day, or even less than 0.5 1 g/m$^2$/day, for a 60 mil thick film. The sealant composition also preferably exhibits a final hardness of less than about 35 Shore A, or even less than 30 Shore A. The sealant composition preferably exhibits less than 50% adhesion failure, less than 20% adhesion failure, or even is free of adhesion failure. The sealant composition preferably exhibits a final lap shear of at least 5 psi, at least 10 psi, or even at least 15, after 12 weeks.

One useful sealant composition includes silane functional poly-α-olefin, thermoplastic elastomer component comprising polyisobutylene and butyl rubber, and tackifying agent. Particularly useful silane functional poly-α-olefins are either completely amorphous or have a low level of crystallinity. In one embodiment, the degree of crystallinity is no greater than 25% as determined by X-ray diffraction. Useful silane functional amorphous poly-α-olefins are derived from amorphous poly-α-olefin and a silane source. Useful amorphous poly-α-olefins include homopolymers, copolymers and terpolymers including, e.g., atactic polypropylene, atactic poly-1-butene and combinations thereof. The amorphous poly-α-olefins can be random or block copolymers. Other suitable amorphous poly-α-olefin polymers include, e.g., homogeneous substantially linear ethylene-α-olefin interpolymers of monomers including, e.g., propylene, 1-butene, 1-pentene, 3-metyl-1-butene, 1-hexene, 3-methyl-1-pentene, 4-methyl-1-pentene, 3-ethyl-1-pentene, 1-octene, 1-decene, and 1-undecene; amorphous copolymers with other olefins (e.g., ethylene, 1-butene, 1-pentene, 1-hexene, 4-methyl-1-pentene, 1-octene, and 1-decene) containing propylene as a main component, amorphous copolymers with other olefins (e.g., ethylene, propylene, 1-pentene, 1-hexene, 4-methyl-1-pentene, 1-octene, 1-decene and the like) containing 1-butene as a main component; and combinations thereof. Preferred olefin-based amorphous polymers include atactic polypropylene, propylene/ethylene amorphous copolymers, and propylene/1-butene amorphous copolymers.

One example of a useful class of amorphous poly-α-olefins includes copolymers and terpolymers derived from 0% by weight to 95% by weight α-olefins having from 4 to 10 carbon atoms, (in other embodiments from 3% by weight to 95% by weight), from 5% by weight to 100% by weight propane (in other embodiments from 5% by weight to 97% by weight), and from 0% by weight to 20% by weight ethane as described, e.g., in U.S. Pat. No. 5,994,474.

In one embodiment, the silane to be grafted on the amorphous poly-α-olefin has two or three alkoxy groups attached directly to the silicon and at least one olefinic double bond containing moiety. Suitable examples include vinyltrimethoxysilane, vinyltriethoxysilane, vinyl tris(2-methoxyethoxy)silane, 3-methacryloxypropyltrimethoxysilane, 3-methacryloxypropyltriethoxysilane, vinyldimethylmethoxysilane and vinylmethyldibutoxysilane.

The amount silane for grafting on the amorphous poly-α-olefin is from about 0.1% by weight to about 10% by weight, from about 2% by weight to about 6% by weight, or even from about 3% by weight to about 5% by weight, based on the amorphous poly-α-olefin.

Any known method for grafting silane onto the amorphous poly-α-olefin can be used including, e.g., solution and melt (e.g., using an appropriate amount of a free-radical donor) methods. Useful methods of preparing silylated amorphous poly-α-olefin are described, e.g., in U.S. Pat. No. 5,994,474 and DE 40 00 695 and incorporated herein. Suitable examples of free-radical donors include diacyl peroxides such as dilauryl peroxide and didecanoyl peroxide, alkyl peresters such as tert-butyl peroxy-2-ethylhexanoate, perketals such as 1,1-di(tert-butylperoxy)-3,3,5-trimethylcyclohexane or 1,1-di(tert-butylperoxy)cyclohexane, dialkyl peroxides such as tert-butyl cumyl peroxide, di(tert-butyl) peroxide and dicumyl peroxide, C-radical donors including, e.g., 3,4-dimethyl-3,4-diphenylhexane and 2,3-dimethyl-2,3-diphenylbutane, and azo compounds (e.g., 2,2'-azodi(2-acetoxypropane)).

Preferably the amorphous poly-α-olefin has a number average molecular weight (Mn) from about 7,000 to about 14,000, a weight average molecular weight (Mw) from about 35,000 to about 90,000 and a Z average molecular weight (Mz) from about 13,000 to about 33,000, and polydispersity (MWD) from about 4.9 to about 6.2.

Preferred silane functional amorphous poly-α-olefins include the silane functional amorphous poly-α-olefins that are commercially available under the VESTOPLAST trade designation from DeGussa-Hüls, Germany including, e.g., VESTOPLAST 206V silane functional amorphous poly-α-olefins.

The silane functional poly-α-olefin is present in the composition in an amount of from about 5% by weight to about 80% by weight, from about 15% by weight to about 50% by weight, or even from about 25% by weight to about 40% by weight.

The thermoplastic elastomer component of the composition preferably includes polyisobutylene in an amount of at least 10% by weight, at least 15% by weight, or even no greater than 70% by weight, and butyl rubber in an amount of from about 5% by weight to about 40% by weight, or even from about 10% by weight to about 30% by weight. Examples of suitable commercially available butyl rubbers include isobutylene-isoprene copolymers available under the BUTYL Rubber series of trade designations including BUTYL 268 and BUTYL 065 from ExxonMobil Chemical Co. (Houston, Tex.). Examples of suitable commercially available polyisobutylenes include polyisobutylenes available under the OPPANOL B12 trade designation from BASF (Germany) and under the VISTANEX series of trade designations from ExxonMobil including VISTANEX LMMS.

Other useful thermoplastic elastomers include, e.g., ethylene/propylene/diene rubber (i.e., EPDM rubber), and combinations thereof. Other suitable thermoplastic elastomers include, e.g., polyetheramide block copolymers, polyesters, butadiene-styrene elastomers including, e.g., A-B, A-B-A, A-(B-A)n-B, (A-B)n-Y, and radial block copolymers and grafted versions thereof where the A block(s) is a polyvinyl aromatic block (e.g., styrene), and the B block is a rubbery midblock (e.g., isoprene, butadiene, ethylene-butylene, and ethylene-propylene) (e.g., styrene-butadiene-styrene block copolymers, styrene-isoprene-styrene block copolymers, styrene-ethylene-butylene-styrene block copolymers, styrene-ethylene-propylene-styrene block copolymers), polyurethane elastomers, polyolefin elastomers, elastomeric ethylene vinyl acetate, and mixtures thereof.

Useful commercially available thermoplastic elastomers include, e.g., ethylene-propylene copolymers available under the VISTALON series of trade designations including, e.g., VISTALON 404, from Exxon Chemical Co.; styrene-ethylene/butylene-styrene block copolymers available under the KRATON G series of trade designations including, e.g., KRATON G-1652 and G-1657, from Kraton Polymers (Houston, Tex.); styrene-butadiene-styrene and styrene-isoprene-styrene block copolymers available under the KRATON D series of trade designations including, e.g., KRATON D-1111 and D-1112 from Kraton Polymers; silane terminated block copolymers available under the KRATON SKFG101 trade designation from Kraton Polymers; and styrene-butadiene-styrene and styrene-isoprene-styrene block copolymers available under the VECTOR series of trade designations including, e.g., VECTOR 4112, 4114 and 4411 from Dexco Polymers (Houston, Tex.).

Thermoplastic elastomer component may be present in the composition in an amount of from about 10% by weight to about 75% by weight, from about 20% by weight to about 70% by weight, or even from about 30% by weight to about 60% by weight.

The composition optionally includes amorphous poly-α-olefin. Suitable amorphous poly-α-olefins include the amorphous poly-α-olefins set forth above in relation to the production of silane-functional amorphous poly-α-olefins. Amorphous poly-α-olefin is preferably present in the composition in an amount of from about 0% by weight to about 30% by weight, or even from about 10% by weight to about 20% by weight.

Other useful thermoplastic polymers include polyalkylenes (e.g., polyethylene, polypropylene and polybutylene), poly(alpha)olefins including, e.g., homo-, co- and terpolymers of aliphatic mono-1-olefins (alpha olefins) (e.g., poly (alpha)olefins containing from 2 to 10 carbon atoms), homogeneous linear or substantially linear interpolymers of ethylene having at least one $C_3$ to $C_{20}$ alphaolefin, polyisobutylenes, poly(alkylene oxides), poly(phenylenediamine terephthalamide), polyesters (e.g., polyethylene terephthalate), polyacrylates, polymethacrylates, polyacrylamides, polyacrylonitriles, copolymers of acrylonitrile and monomers including, e.g., butadiene, styrene, polymethyl pentene, and polyphenylene sulfide (e.g., styrene-acrylonitrile, acrylonitrile-butadiene-styrene, acrylonitrile-styrene-butadiene rubbers), polyimides, polyamides, copolymers of vinyl alcohol and ethylenically unsaturated monomers, polyvinyl acetate (e.g., ethylene vinyl acetate), polyvinyl alcohol, vinyl chloride homopolymers and copolymers (e.g., polyvinyl chloride), terpolymers of ethylene, carbon monoxide and acrylic acid ester or vinyl monomer, polysiloxanes, polyurethanes, polystyrene, and combinations thereof, and homopolymers, copolymers and terpolymers thereof, and mixtures thereof. Other useful classes of thermoplastic polymers include asphalts, bitumens, crude rubbers, fluorinated rubbers, and cellulosic resins.

Preferred thermoplastic polymers include ethylene vinyl acetate having a vinyl acetate content of from about 10% by weight to about 60% by weight and a melt index of from about 0.2 to 1000, or even a vinyl acetate content of from about 18% by weight to about 50% by weight and a melt index of from about 0.2 to 500.

Useful commercially available thermoplastic polymers include, e.g., atactic polypropylene polymers available under the REXTAC series of trade designations including, e.g., REXTAC RT 2535 and RT 2585, from Rexene Products Co. (Dallas, Tex.) and the EASTOFLEX series of trade designations including, e.g., EASTOFLEX E1060 and E1003, from Eastman Chemical Co. (Kingsport, Tenn.); polyethylene polymers available under the EPOLENE C series of trade designations from Eastman Chemical Co.; ethylene vinyl acetate copolymers available under the ATEVA series of trade designations from AT Plastics (Brampton, Ontario, Canada) including ATEVA 4030MC and ATEVA 1850, the ELVAX series of trade designations from DuPont de Nemours (Wilmington, Del.) and the ULTRATHENE series of trade designations from Millennium Petrochemicals (Rolling Meadows, Ill.); ethylene methyl acrylate copolymers available under the OPTEMA series of trade designations from Exxon Chemical Co. (Houston, Tex.); ethylene n-butyl acrylate copolymers available under the LOTRYL series of trade designations from Elf Atochem North America (Philadelphia, Pa.), the ESCORENE series of trade designations from Exxon Chemical Co. and the ENATHENE series of trade designations from Millennium Petrochemicals; ethylene n-butyl acrylate carbon monoxide terpolymers available under the ELVALOY series of trade designations from DuPont; thermoplastic polyurethane polymers available under the PEARLSTICK series of trade designations from Aries Technologies (Derry, N.H. a distributor for Merquinsa, Barcelona, Spain); butylene/poly (alkylene ether) phthalate polymers available under the HYTREL series of trade designations from DuPont; ethylene acrylate copolymers also available under the ELVALOY series of trade designations from DuPont; and acrylic polymers available under the ELVACITE series of trade designations from ICI Acrylics (St. Louis, Mo.).

Useful commercially available homogeneous linear or substantially linear interpolymers of ethylene having at least one $C_3$ to $C_{20}$ alphaolefin and a polydispersity less than about 2.5 include, e.g., EXACT 5008 ethylene-butene copolymer, EXXPOL SLP-0394 ethylene-propylene copolymer, and EXACT 3031 an ethylene-hexene copolymer from Exxon Chemical Co. (Houston, Tex.) and ethylene/1-octene polymers available under the trade designations AFFINITY, INSIGHT and ENGAGE from Dow Chemical Co. (Midland, Mich.).

The composition can include a thermoplastic component that includes thermoplastic elastomer, thermoplastic polymer or a combination thereof, in an amount from about 5% by weight to about 75% by weight, from about 5% by weight to about 60% by weight, or even from about 10% by weight to about 30% by weight.

Preferred tackifying agents have a ring and ball softening point of from about 50° C. to about 150° C., in other embodiments from about 80° C. to about 120° C. The tackifying agent preferably is free of groups with which the silanol group of the silyated amorphous poly-α-olefin will react. Examples of suitable tackifying agents include aliphatic, cycloaliphatic, aromatic, aliphatic-aromatic, aromatic modified alicyclic, and alicyclic hydrocarbon resins and modified versions and hydrogenated derivatives thereof; terpenes (polyterpenes), modified terpenes (e.g., phenolic modified terpene resins), hydrogenated derivatives thereof and mixtures thereof; alpha methyl styrene resins and hydrogenated derivatives thereof; and combinations thereof. Other useful tackifying agents are disclosed in, e.g., U.S. Pat. No. 6,355,317, and incorporated herein.

Other tackifying agents include natural and modified rosins such as gum rosin, wood rosin, tall oil rosin, distilled rosin, completely or partially hydrogenated rosin, dimerized rosin and polymerized rosin; rosin esters including, e.g., glycerol and pentaerythritol esters of natural and modified rosins, (e.g., glycerol esters of pale, wood rosin, glycerol esters of hydrogenated rosin, glycerol esters of polymerized rosin, pentaerythritol esters of hydrogenated rosin and phenolic-modified pentaerythritol esters of rosin); alpha methyl styrene resins and hydrogenated derivatives thereof; low molecular weight polylactic acid; and combinations thereof.

Suitable commercially available tackifying agents include, e.g., partially hydrogenated cycloaliphatic petroleum hydrocarbon resins available under the EASTOTAC series of trade designations including, e.g., EASTOTAC H-100, H-115, H-130 and H-142 from Eastman Chemical Co. (Kingsport, Tenn.) available in grades E, R, L and W, which have differing levels of hydrogenation from least hydrogenated (E) to most hydrogenated (W), the ESCOREZ series of trade designations including, e.g., ESCOREZ 1310, ESCOREZ 5300 and ESCOREZ 5400 from Exxon Chemical Co. (Houston, Tex.), and the HERCOLITE 2100 trade designation from Hercules (Wilmington, Del.); partially hydrogenated aromatic modified petroleum hydrocarbon resins available under the ESCOREZ 5600 trade designation from Exxon Chemical Co.; aliphatic-aromatic petroleum hydrocarbon resins available under the WINGTACK EXTRA trade designation from Goodyear Chemical Co. (Akron, Ohio); styrenated terpene resins made from d-limonene available under the ZONATAC 105 LITE trade designation from Arizona Chemical Co. (Panama City, Fla.); aromatic hydrogenated hydrocarbon resins available under the REGALREZ 1094 trade designation from Hercules; and alphamethyl styrene resins available under the trade designations KRISTALEX 3070, 3085 and 3100, which have softening points of 70° C., 85° C. and 100° C., respectively, from Hercules.

The tackifying agent is preferably present in the composition in an amount of from about 5% by weight to about 60% by weight, from about 10% by weight to about 50% by weight, or even from about 10% by weight to about 30% by weight.

The composition can also include a silane-containing coupling agent, which is also referred to as a "silane adhesion promoter." Examples of silane-containing coupling agents include 3-glycidyloxypropyl trialkoxysilane, 3-acryloxypropyl trialkoxysilane, 3-amino-propyl trialkoxysilane, vinyl trialkoxylsilane, N-aminoethyl-3-aminopropyl methyl dialkoxysilane, phanylaminopropyl trialkoxysilane, aminoalkyl trialkoxydisilane, aminoalkyl i-butyl methoxysilane, and combinations thereof.

Useful commercially available silane coupling agents are available, e.g., under the SILQUEST series of trade designations including, e.g., SILQUEST Y-11597, SILQUEST A-1170, SILQUEST A-1110, SILQUEST Y-9669 and SILQUEST A-15 from OSi Specialties-Crompton Corp. (Greenwich, Conn.), under the DYNASYLAN series of trade designations including, e.g., DYNASYLAN 1189 N-(n-butyl)aminopropyltrimethoxysilane and DYNASYLAN MTMO 3-mercaptopropyl trimethoxy silane both of which are available from Degussa Corporation (Naperville, Ill.), under the A-189 gamma-mercaptopropyltrimethoxysilane trade designation from OSi Specialties-Crompton Corp., and tris(3-trimethoxysilylpropyl) iso-cyanurate from Gelest, Inc. (Morrisville, Pa.).

The silane coupling agent is preferably present in the composition in an amount of from about 0% by weight to about 5% by weight, from about 0.2% by weight to about 2% by weight, or even from about 0.4% by weight to about 1% by weight.

The composition can also include other additives including, e.g., fillers (e.g., silica, precipitated silica, talc, calcium carbonates, carbon black, aluminasilicates, clay, zeolites, ceramics, mica, titanium dioxide, and combinations thereof), waxes, plasticizers thermal stabilizers, light stabilizers (e.g., UV light stabilizers and absorbers), optical brighteners, antistats, lubricants, antioxidants, catalysts, rheology modifiers, biocides, corrosion inhibitors, dehydrators, organic solvents, colorants (e.g., pigments and dyes), surfactants antiblocking agents, nucleating agents, flame retardants and combinations thereof. The type and amount of other additives is selected to minimize the present of moisture that can prematurely initiate cure of the sealant.

Preferred plasticizers include paraffinic oils, naphthenic oils, low molecular weight poly-1-butene, low molecular weight polyisobutene, and combinations thereof.

A crosslinking accelerator can be added to the composition to increase the rate of crosslinking. Useful crosslinking accelerators include, e.g., organotin compounds including, e.g., dialkyl tin dicarboxylates (e.g., dibutyl tin dilaurate and dibutyl tin diacetate), tin carboxylates, tertiary amines, stannous salts of carboxylic acids, e.g., stannous octoate and stannous acetate, tetrabutyl dioleatodistannoxane, titanium compounds, organosilicon titantates, alkyltitantates, and metal alkoxides (e.g., aluminum isopropoxide and zirconium isopropoxide), and combinations thereof.

Other useful classes of sealant compositions suitable for low temperature press applications include, e.g., polyurethanes, polyisobutylenes, butyl rubbers, elastomers, natural and synthetic rubber, silicones, polysulfides, acrylates, and combinations thereof. Preferred sealant compositions include polar reactive groups (e.g., alkoxy, urethane, ester, mercapto, and combinations thereof) to provide sufficient chemical or polar bonding with the target substrates (e.g., polyvinyl chloride and glass).

Useful desiccants adsorb moisture, organic volatiles, or a combination thereof, from the sealed chamber formed by the spacer and the glass panes of the glass assembly. Desiccant can be provided in many forms and can be disposed in a channel of an insulating glass assembly, on the surface of a spacer of an insulating glass assembly, and combinations thereof. Preferred desiccant matrices are capable of being dispensed at ambient temperature, or even from 15° C. to 30° C. Useful adsorbent components of the desiccant matrix include, e.g., moisture adsorbents, adsorbents of low molecular weight organics and combinations thereof including, e.g., natural zeolites (e.g. chabasite, gumerinite, levynite, erinitc, mordenite and analcite), molecular sieves, silica gel, silica-magnesia gel, silica-alumina gel, activated carbon, activated alumina, and combinations thereof. Particularly useful adsorbent components include molecular sieve 13x, which is capable of removing moisture and volatile organics, and molecular sieves 3A and 4A. Desirably the adsorbent components are in the form of a powder of from 50 mesh to 100 mesh, or even less than 50 mesh.

Various desiccating matrix compositions and constructions are disclosed, e.g., in U.S. Pat. No. 5,510,416 (Meyer et al.), U.S. Pat. No. 5,632,122 (Spinks), U.S. Pat. Nos. 5,503,884, and 5,436,040 (Lafond). Commercially available desiccating matrix compositions include, e.g., TL-5042M ambient applied desiccating matrix from H.B. Fuller Company (Vadnais Heights, Minn.), PRC 525 ambient applied desiccating matrix from PRC (Burbank, Calif.) and HL-5157 warm applied desiccating matrix from H.B. Fuller Company.

The insulating glass assembly can also include a vapor barrier. The vapor barrier impedes, and preferably prevents volatile organic compounds, moisture or a combination thereof from entering the sealed air chamber. The vapor barrier can be positioned on the spacer to prevent organic volatiles from escaping from the spacer into the sealed air chamber. The vapor barrier can also be positioned on at least one glazing surface to prevent moisture from entering in the sealed air chamber in the area between the glass pane and the spacer. The sealant composition can provide the vapor barrier function or the vapor barrier can be a separate composition or structure. The vapor barrier can be in the form of a coating, foil, a strip and combinations thereof, and can include metal, plastic, ceramic, and combinations thereof. Various vapor barrier compositions and constructions are disclosed, e.g., in U.S. Pat. Nos. 6,463,706 and 4,015,394.

The insulating glass assembly can also include a glazing bead. A glazing bead, which is also known as a "glazing stop," can provide a visual barrier to the spacer or the bond line formed by the sealant at the bond between the glass pane and the spacer. Alternatively or in addition, during the manufacturing process, glazing beads can temporarily hold the glass pane in place while allowing the sealant to cure.

The glass of the insulating glass assembly can include tempered glass, stained glass, plate glass, bullet-proof glass, or other specialty glasses.

In some embodiments of the insulating glass assembly, at least one component, e.g., the frame, of the insulating glass assembly can be hollow or solid, and made from a variety of materials including, e.g., wood, metal (e.g., aluminum and steel), thermoplastic, thermoset, composites (e.g., wood fiber and polymer (e.g., polyvinyl chloride) composites, fiberglass reinforced composites) and combinations thereof. The frame can be made by a variety of methods including, e.g., milling, molding extruding, pultruding and combinations thereof.

The invention will now be described by way of the following examples.

EXAMPLES

Test Procedures

Test procedures used in the examples include the following.

Glass Bond Adhesion Test

A film of the sealant composition is pressed at 100° C. to a film having a thickness of from 40 mil to 60 mil. A 3 in×0.25 in section of the film of sealant is pressed on a 3 in×1 in piece of glass. A 2 in×1.5 in spacer is pressed on top of the sealant film. A second 3 in×0.25 in section of film of sealant, having a thickness of from 40 mil to 60 mil, is pressed on the 3 in×3 in piece of glass and the film side is then pressed against the spacer using hand pressure. The samples are then placed in an oven that has been preheated to 120° C. The jig including the test specimen is stored in the oven for 10 minutes while maintaining the oven temperature at 120° C. The jig is then removed from the oven and cooled. The test specimen is then removed from the jig and cooled overnight.

Conditioning

One Week Room Temperature: The test specimen prepared according to the glass bond adhesion test is stored at room temperature and about 50% relative humidity for one week prior to testing.

One Week Water Soak: The test specimen prepared according to the glass bond adhesion test is placed in deionized water at room temperature for one week and then removed and dried prior to testing.

One Week Precondition: The test specimen prepared according to the glass bond adhesion test is conditioned at 60° C. and 100% relative humidity for one week prior to testing.

After conditioning, the test specimens are observed to determine the % adhesion failure to glass for each bond under each condition. The average % adhesion failure is reported.

Lap Shear Strength

The lap shear strength is determined according to ASTM C-961-01 entitled, "Standard Test Method for Lap Shear Strength of Hot Applied Sealants," with the exception that the test specimen is prepared as follows. A 1 in×1 in film of sealant composition having a thickness of from 50 mil to 60 mil is placed on a 4 in×1 in piece of aluminum. A 1 in×3 in piece of glass is then placed on top of the film and pressed hard against the film using maximum hand pressure.

Twenty-four hour lap shear is measured 24 hours after preparing the test specimen.

Final lap shear is measured 12 weeks after preparing the test specimen.

Needle Penetration

Needle penetration is determined according to ASTM D5. A 50 g needle and a 50 pound weight are used. The sample is of a sufficient depth such that the needle, when fully penetrated into the sample, is touching the sample and not the underlying substrate. The test is conducted at 25° C.

Example 1

The sealant composition of Example 1 was prepared by sequentially charging, with low speed mixing, the following components into a sigma blade mixer, which had been preheated to 120° C., equipped with a vacuum pump: 120 g BUTYL 065 butyl rubber (ExxonMobil Chemical Co., Houston, Tex.), 120 g VISTANEX LM (ExxonMobil), 89.4 g EASTOFLEX E1003 amorphous ethylene/propylene copolymer (Eastman Chemical Co., Kingsport, Tenn.), 198.8 g ESCOREZ 1310LC resin (ExxonMobil Chemical Co., Houston, Tex.) and 1.8 g MONARCH 120 black pigment (Cabot, Pittsburgh, Pa.). The mixer was maintained 120° C. throughout the process. The vacuum was turned on and the composition was mixed for 30 minutes at low speed. Then 250 g VESTOPLAST 206V silanated amorphous poly-α-olefin (Degussa-Hüls, Germany) was charged to the mixture with mixing at low speed, under vacuum for 30 minutes, which was followed by the addition of 0.16 g dibutyl tin diluarate with mixing at low speed under vacuum for 15 minutes.

Examples 2 and 3

The sealant compositions of Examples 2 and 3 were prepared according to the method of Example 1 with the exception that the components and the amounts thereof were as set forth in Table 1. The compositions of Examples 2 and 3 were tested according to the initial lap shear, final lap shear, moisture vapor transmission rate, initial hardness, final hardness and adhesion failure test methods set forth above. The results are reported in Table 1. The compositions of Examples 2 and 3 were tested according to the Accelerated Aging test method and passed.

TABLE 1

| Component | 2 | 3 |
|---|---|---|
| Vestoplast 206V | 120 | 120 |
| Butyl Rubber | 120 | 120 |
| Vistanex LMMS | 150 | 150 |
| Eastoflex 1003 | 89.4 | 118.8 |
| Escorez 1310 | 198.8 | 89.4 |
| Monarch 120 | 1.8 | 1.8 |
| Dibutyltin Dilaurate | 0.05 | 0.05 |
| Final Lap Shear (psi) | 12 | 16 |
| MVTR g/m$^2$/day | 0.35 | 0.6-0.8 |
| Needle Penetration (mm) | 4.0 | 4.0 |
| Initial Shore A | 25-30 | 27-30 |
| Final Shore A | 30-32 | 30-32 |
| Adhesion Failure (%) | | |
| 1 week at room temp | 0 | 0 |
| 1 week water soak | 0 | 0 |
| 1 week precondition | 0 | 0 |

While numerous embodiments and examples have been disclosed herein, it should be apparent that modifications can be made without departing from the spirit and scope of the invention. Therefore, the appended claims are intended to cover all such modifications that are within the scope of this invention. The relevant portions of all documents disclosed herein are hereby incorporated by reference in their entirety. Reference to a document is not to be construed as an admission that such document is prior art.

Other embodiments are within the claims. For example, the insulating glass assembly has been described as including at least two panes and can be constructed to include any number of panes.

What is claimed is:

1. A moisture curable sealant composition comprising:
    silane-functional amorphous poly-α-olefin;
    from 10% by weight to about 40% by weight butyl rubber;
    polyisobutylene; and
    tackifying agent,
    the composition exhibiting a needle penetration from about 3.5 mm to less than 8.0 mm.

2. The sealant composition of claim 1, wherein the composition exhibits a needle penetration from about 4.0 mm to about 6.0 mm.

3. The sealant composition of claim 1, wherein the sealant composition, when in the form of a 60 mil film, exhibits a moisture vapor transmission rate no greater than 1 g/m$^2$/day.

4. The sealant composition of claim 1, wherein the sealant composition exhibits a final hardness of less than about 35 Shore A.

5. The sealant composition of claim 1, further comprising amorphous poly-α-olefin.

6. The sealant composition of claim 5 comprising no greater than about 30% by weight of the amorphous poly-α-olefin.

7. The sealant composition of claim 1 comprising from about 5% by weight to about 80% by weight silane functional amorphous poly-α-olefin.

8. The sealant composition of claim 1 comprising from about 15% by weight to about 50% by weight silane functional amorphous poly-α-olefin.

9. The sealant composition of claim 1 comprising from 10% by weight to about 30% by weight butyl rubber.

10. The sealant composition of claim 1 comprising at least 10% by weight polyisobutylene.

11. The sealant composition of claim 1 comprising from about 5% by weight to about 60% by weight tackifying agent.

12. The sealant composition of claim 1, wherein said sealant composition exhibits a final lap shear of at least 10 psi after twelve weeks.

13. The sealant composition of claim 1, wherein said sealant composition exhibits less than 20% adhesion failure.

14. The sealant composition of claim 1, wherein said sealant composition is free of adhesion failure.

15. The sealant composition of claim 1, wherein said sealant composition comprises from about 15% by weight to about 50% by weight silane-functional amorphous poly-α-olefin;

from about 10% by weight to about 50% by weight tackifying agent;

at least 10% by weight polyisobutylene; and from 10% by weight to about 40% by weight butyl rubber.

16. The sealant composition of claim 1 further comprising no greater than about 30% by weight amorphous poly-α-olefin other than said silane-functional amorphous poly-α-olefin.

17. The sealant composition of claim 1 further comprising from about 0.2% by weight to about 2% by weight silane coupling agent.

* * * * *